US012469440B1

(12) United States Patent
Chang

(10) Patent No.: US 12,469,440 B1
(45) Date of Patent: Nov. 11, 2025

(54) DISPLAY APPARATUS

(71) Applicant: AUO Corporation, Hsinchu (TW)

(72) Inventor: Chia-Chun Chang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/950,209

(22) Filed: Nov. 18, 2024

(30) Foreign Application Priority Data

Aug. 8, 2024 (TW) ................................ 113129736

(51) Int. Cl.
*G09G 3/32* (2016.01)

(52) U.S. Cl.
CPC ....... *G09G 3/32* (2013.01); *G09G 2300/0452* (2013.01); *G09G 2320/0233* (2013.01); *G09G 2320/0247* (2013.01)

(58) Field of Classification Search
CPC ............. G09G 3/32; G09G 2300/0452; G09G 2320/0233; G09G 2320/0247
See application file for complete search history.

(56) References Cited

U.S. PATENT DOCUMENTS

| | | | | |
|---|---|---|---|---|
| 9,445,064 | B2 | 9/2016 | Hosoki | |
| 9,613,559 | B2 | 4/2017 | Kuijpers et al. | |
| 10,066,819 | B2 * | 9/2018 | Cok | H05B 45/42 |
| 10,091,446 | B2 * | 10/2018 | Cok | G09G 3/3208 |
| 10,468,391 | B2 * | 11/2019 | Cok | H10D 86/60 |
| 10,546,796 | B2 * | 1/2020 | Hu | H01L 24/16 |
| 10,818,241 | B2 * | 10/2020 | Kim | H10K 59/129 |
| 10,832,609 | B2 * | 11/2020 | Rotzoll | G09G 3/2007 |
| 11,257,860 | B2 * | 2/2022 | Chen | H01L 25/0753 |
| 11,327,917 | B2 * | 5/2022 | Gray | G06F 13/4077 |
| 11,361,706 | B2 * | 6/2022 | Lee | G09G 3/32 |
| 11,373,589 | B1 * | 6/2022 | Yeh | G09G 3/32 |
| 11,568,789 | B2 * | 1/2023 | Sakariya | G09G 3/32 |
| 11,580,929 | B2 * | 2/2023 | Iverson | G06F 3/013 |
| 11,688,336 | B2 * | 6/2023 | Zhao | H10H 20/857 345/206 |

(Continued)

FOREIGN PATENT DOCUMENTS

| | | |
|---|---|---|
| CN | 106023907 | 10/2016 |
| TW | 202242833 | 11/2022 |

(Continued)

*Primary Examiner* — Michael J Jansen, II
(74) *Attorney, Agent, or Firm* — JCIPRNET

(57) ABSTRACT

A display apparatus is provided. The display apparatus includes multiple pixel circuits, a timing controller, and multiple display driving circuits. The pixel circuits are divided into multiple pixel groups, and each has a first color light-emitting diode, a second color light-emitting diode, and a third color light-emitting diode. The timing controller provides multiple display data. The display driving circuit, according to the corresponding display data, drives the pixel circuit in the corresponding pixel group to sequentially illuminate one of the first color light-emitting diodes, the second color light-emitting diodes, and the third color light-emitting diodes in multiple illumination periods. During each illumination period, the pixel groups alternately illuminate a part of the first color light-emitting diodes, a part of the second color light-emitting diodes, and a part of the third color light-emitting diodes.

8 Claims, 8 Drawing Sheets

(56) References Cited

U.S. PATENT DOCUMENTS

| | | | | |
|---|---|---|---|---|
| 11,715,413 | B2 * | 8/2023 | Oh | H10H 20/857<br>345/55 |
| 11,929,012 | B2 * | 3/2024 | Park | G09G 3/32 |
| 12,046,208 | B2 * | 7/2024 | Kim | G09G 3/32 |
| 12,125,432 | B2 * | 10/2024 | Jung | G09G 3/2014 |
| 12,131,696 | B2 | 10/2024 | Lee et al. | |
| 12,132,037 | B2 * | 10/2024 | Oh | G09G 3/3233 |
| 12,278,225 | B2 * | 4/2025 | Oh | G09F 9/302 |
| 12,307,944 | B2 * | 5/2025 | Kyles | G09G 5/006 |
| 2016/0014384 | A1 * | 1/2016 | Hosoki | G09G 3/3413<br>348/791 |
| 2016/0127771 | A1 * | 5/2016 | Pasqualino | H04N 19/65<br>348/474 |
| 2016/0253945 | A1 * | 9/2016 | Kuijpers | G09G 3/3426<br>345/691 |
| 2017/0167703 | A1 * | 6/2017 | Cok | F21V 23/001 |
| 2018/0019747 | A1 * | 1/2018 | Ikegawa | H03K 17/168 |
| 2018/0191978 | A1 * | 7/2018 | Cok | H04N 25/779 |
| 2018/0197471 | A1 * | 7/2018 | Rotzoll | G09G 3/2003 |
| 2018/0226386 | A1 * | 8/2018 | Cok | H10D 86/441 |
| 2019/0115274 | A1 * | 4/2019 | Hu | H01L 24/16 |
| 2019/0206330 | A1 * | 7/2019 | Kim | G09G 3/3233 |
| 2020/0301868 | A1 * | 9/2020 | Gray | G06F 13/4077 |
| 2021/0126048 | A1 * | 4/2021 | Chen | G09G 3/32 |
| 2021/0210046 | A1 * | 7/2021 | Iverson | G09G 5/006 |
| 2021/0217354 | A1 * | 7/2021 | Lee | H01L 25/167 |
| 2021/0366349 | A1 * | 11/2021 | Sakariya | G09G 3/2014 |
| 2022/0172674 | A1 * | 6/2022 | Oh | G09G 3/32 |
| 2022/0223576 | A1 * | 7/2022 | Oh | G09G 3/32 |
| 2022/0223577 | A1 * | 7/2022 | Oh | G09G 3/32 |
| 2022/0270544 | A1 * | 8/2022 | Park | G09G 3/32 |
| 2022/0277689 | A1 * | 9/2022 | Zhao | G09G 3/3266 |
| 2023/0196979 | A1 * | 6/2023 | Cok | G09G 3/32<br>345/55 |
| 2024/0038157 | A1 | 2/2024 | Lee et al. | |
| 2024/0054947 | A1 * | 2/2024 | Jung | G09G 3/2014 |
| 2024/0161708 | A1 * | 5/2024 | Kim | G09G 3/32 |
| 2024/0194120 | A1 * | 6/2024 | Kyles | G06F 3/14 |

FOREIGN PATENT DOCUMENTS

| | | |
|---|---|---|
| TW | 202420267 | 5/2024 |
| WO | 2014141879 | 9/2014 |

* cited by examiner

DISPLAY APPARATUS

CROSS-REFERENCE TO RELATED APPLICATION

This application claims the priority benefit of Taiwan application serial no. 113129736, filed on Aug. 8, 2024. The entirety of the above-mentioned patent application is hereby incorporated by reference herein and made a part of this specification.

BACKGROUND

Technical Field

The disclosure relates to a display apparatus, and in particular to a display apparatus having a pixel circuit with a light-emitting element.

Description of Related Art

In recent years, due to advantages such as low power consumption, thinner display panel thickness, vivid colors, and enhanced contrast, as well as overcoming the issue of motion blur, self-emissive display technology has become mainstream for display devices. Currently, the primary light-emitting elements used in self-emissive display technology are organic light-emitting diodes (OLED), mini light-emitting diodes (mini LED), and micro light-emitting diodes (micro LED).

Taking mini LEDs and micro LEDs as examples, both use compound semiconductors for production (or formation). To enable light-emitting diode elements like mini LEDs and micro LEDs to achieve better electro-optical conversion efficiency, the light-emitting diode elements operate at a specific current density. That is, light-emitting diodes of different colors (such as red, green, blue, etc.) use different current densities. To reduce the system's maximum current load, color rotation lighting is commonly adopted. However, because light-emitting diodes of different colors correspond to different current densities, the instantaneous brightness of light-emitting diodes of different colors also varies, causing brightness flicker in static images.

Moreover, even invisible brightness flicker may cause visual fatigue to the human eye over prolonged use.

SUMMARY

The disclosure provides a display apparatus that may reduce flicker on a display screen caused by pixel circuits having light-emitting diodes of different colors.

The display apparatus includes multiple pixel circuits, a timing controller, and multiple display driving circuits. The pixel circuits are arranged in arrays, divided into multiple pixel groups, and each pixel circuit has a first color light-emitting diode, a second color light-emitting diode, and a third color light-emitting diode. The timing controller is used to provide multiple display data. The display driving circuits are arranged in arrays and individually coupled to the timing controller and a corresponding one of the pixel circuits, to drive the pixel circuits in the corresponding pixel group to sequentially illuminate one of the first color light-emitting diodes, the second color light-emitting diodes, and the third color light-emitting diodes during multiple illumination periods based on a corresponding one of the display data. During each illumination period, the pixel groups alternately illuminate a part of the first color light-emitting diodes, a part of the second color light-emitting diodes, and a part of the third color light-emitting diodes.

Based on the above, in one illumination period, among all pixel groups, apart illuminates the first color light-emitting diodes, a part illuminates the second color light-emitting diodes, and a part illuminates the third color light-emitting diodes, such that the lighting sequence of the first, second, and third color light-emitting diodes is staggered in different but adjacent pixel groups. This arrangement enhances the stability of brightness over time across various positions of the display panel, thereby reducing visual fatigue for the viewer.

To make the features and advantages of the disclosure more comprehensible, several embodiments accompanied with drawings are described in detail as follows.

DESCRIPTION OF THE EMBODIMENTS

Unless otherwise defined, all terms (including technical and scientific terms) used herein have the same meaning as commonly understood by those of ordinary skill in the art to which the disclosure belongs. It will be further understood that terms such as those defined in commonly used dictionaries should be interpreted as having meanings consistent with the relevant art and the background or context of the disclosure, and should not be interpreted in an idealized or overly formal way, unless otherwise defined in the embodiments of the disclosure.

It will be understood that although terms such as "first", "second", and "third" may be used herein to describe various elements, components, regions, layers, and/or parts, the elements, components, regions, layers, and/or parts are not be limited by the terms. The terms are only used to distinguish one element, component, region, layer, or part from another element, component, region, layer, or part. Thus, a first "element", "component", "region", "layer", or "part"

discussed below may be referred to as a second element, component, region, layer, or part without departing from the teachings herein.

The terms used herein are only for the purpose of describing particular embodiments and are not limiting. As used herein, singular forms "a", "an", and "the" are intended to include plural forms, including "at least one" or representing "and/or" unless the content clearly dictates otherwise. As used herein, the term "and/or" includes any and all combinations of one or more of the related listed items. It should also be understood that when used in the specification, the terms "containing" and/or "including" designate the presence of stated features, regions, entireties, steps, operations, elements, and/or components, but do not exclude the presence or addition of one or more other features, regions, entireties, steps, operations, elements, components, and/or combinations thereof.

Figure 1:
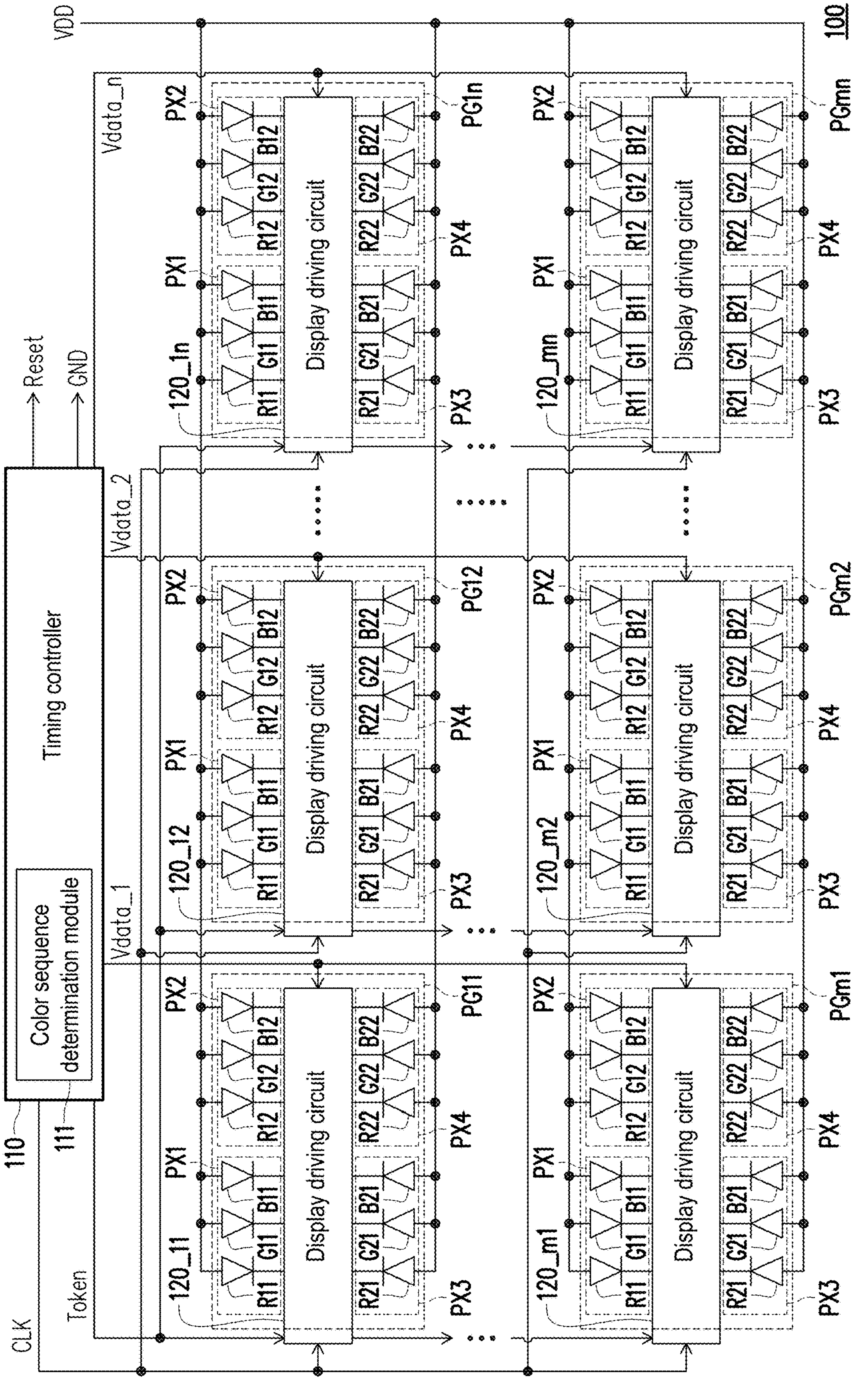
FIG. 1 is a system schematic diagram of a display apparatus according to an embodiment of the disclosure.

FIG. 1 is a system schematic diagram of a display apparatus according to an embodiment of the disclosure. Referring to FIG. 1, in this embodiment, a display apparatus 100 includes a timing controller 110, multiple pixel circuits (such as PX1 to PX4), and multiple display driving circuits (120_11 to 120_1*n*, and 120_*m*1 to 120_*mn*), where m and n are independent and are a positive integer respectively. The timing controller 110 is used to provide multiple display data (such as Vdata_1 to Vdata_n). The pixel circuits (PX1 to PX4) are arranged in arrays and are divided into multiple pixel groups (PG11 to PG1*n*, and PGm1 to PGmn), and each pixel circuit (such as PX1 to PX4) has a red light-emitting diode such as R11, R12, R21, and R22 (corresponding to a first color light-emitting diode), a green light-emitting diode such as G11, G12, G21, and G22 (corresponding to a second color light-emitting diode), and a blue light-emitting diode such as B11, B12, B21, and B22 (corresponding to a third color light-emitting diode).

In this embodiment, the display driving circuits (such as 120_11 to 120_1*n*, and 120_*m*1 to 120_*mn*) are arranged in arrays and are each coupled to the timing controller 110. Each display driving circuit (120_11 to 120_1*n*, and 120_*m*1 to 120_*mn*) corresponds to one pixel group (PG11 to PG1*n*, and PGm1 to PGmn). For example, the display driving circuit 120_11 corresponds to the pixel group PG11, and the display driving circuit 120_12 corresponds to the pixel group PG12, with the rest as shown in the figure, which will not be further elaborated here.

Each display driving circuit (such as 120_11 to 120_1*n*, and 120_*m*1 to 120_*mn*) is coupled to at least one pixel circuit in the corresponding pixel group (such as PG11 to PG1*n*, and PGm1 to PGmn) (in this case, four pixel circuits PX1 to PX4 are taken as examples, but the embodiments of the disclosure are not limited thereto), to sequentially illuminate one of the red light-emitting diode (such as R11, R12, R21, and R22), the green light-emitting diode (such as G11, G12, G21, and G22), and the blue light-emitting diode (such as B11, B12, B21, and B22) in each pixel circuit of the corresponding pixel group (such as PG11 to PG1*n*, and PGm1 to PGmn) during multiple illumination periods based on a corresponding one of the display data (such as Vdata_1 to Vdata_n).

During each illumination period, in all pixel groups (such as PG11 to PG1*n*, and PGm1 to PGmn), some of the red light-emitting diodes (such as R11, R12, R21, and R22) are illuminated alternately, some of the green light-emitting diodes (such as G11, G12, G21, and G22) are illuminated alternately, and some of the blue light-emitting diodes (such as B11, B12, B21, and B22) are illuminated alternately.

Based on the above, during one illumination period, in all pixel groups, part of the red light-emitting diodes are illuminated, part of the green light-emitting diodes are illuminated, and part of the blue light-emitting diodes are illuminated, so that in different but adjacent pixel groups, the lighting sequence of the red light-emitting diodes, green light-emitting diodes, and blue light-emitting diodes is staggered. This configuration enhances the stability of brightness across various positions on the display panel over time, thereby reducing visual fatigue for the viewer. Additionally, without increasing the pulse width modulation (PWM) frequency, the illumination frequency may be approximately tripled.

In this embodiment, each display driving circuit (120_11 to 120_1*n*, and 120_*m*1 to 120_*mn*) is coupled to the cathodes of the red light-emitting diodes R11, R12, R21, and R22, the cathodes of the green light-emitting diodes G11, G12, G21, and G22, and the cathodes of the blue light-emitting diodes B11, B12, B21, and B22 in the corresponding pixel group (PG11 to PG1*n*, and PGm1 to PGmn) in the pixel circuits PX1 to PX4. Additionally, the anodes of the red light-emitting diodes R11, R12, R21, and R22, the anodes of the green light-emitting diodes G11, G12, G21, and G22, and the anodes of the blue light-emitting diodes B11, B12, B21, and B22 in the pixel circuits PX1 to PX4 in all pixel groups (PG11 to PG1*n*, and PGm1 to PGmn) are collectively coupled to (receive) a system high voltage VDD. However, the embodiments of the disclosure are not limited thereto.

In this embodiment, the timing controller 110 is further coupled to (receive) a ground voltage GND, and may also provide a reset signal Reset, a timing token Token, and a clock signal CLK. The reset signal Reset is used to reset the display driving circuits (such as 120_11 to 120_1*n*, and 120_*m*1 to 120_*mn*), and the clock signal CLK serves as the operational reference for the display driving circuits (such as 120_11 to 120_1*n*, and 120_*m*1 to 120_*mn*). The timing token Token is transmitted through the display driving circuits (such as 120_11 to 120_1*n*, and 120_*m*1 to 120_*mn*) row by row, to activate each display driving circuit (such as 120_11 to 120_1*n*, and 120_*m*1 to 120_*mn*) in sequence.

For example, the display driving circuit 120_11 is activated upon receiving the timing token Token from the timing controller 110. Then, based on the display data Vdata_1 from the timing controller 110, the illumination pattern of the red light-emitting diodes R11, R12, R21, and R22, the green light-emitting diodes G11, G12, G21, and G22, and the blue light-emitting diodes B11, B12, B21, and B22 in the pixel group PG11 is set (e.g., the sequence of illumination time, the current level of the illuminated light-emitting diodes, and the duration of illumination time). Afterward, the driving circuit 120_11 transmits the timing token Token to the next-stage display driving circuit (such as 120_11 to 120_1*n*, and 120_*m*1 to 120_*mn*) to activate the next display driving circuit (such as 120_11 to 120_1*n*, and 120_*m*1 to 120_*mn*). The operation of the other display driving circuits (such as 120_11 to 120_1*n*, and 120_*m*1 to 120_*mn*) is generally the same, which will not be further detailed here.

In this embodiment, the timing controller 110 may include a color sequence determination module 111 to determine the timing of the illumination of the anodes of the red light-emitting diodes R11, R12, R21, and R22, the green light-emitting diodes G11, G12, G21, and G22, or the blue light-emitting diodes B11, B12, B21, and B22 in the pixel circuits PX1 to PX4 of each pixel group (PG11 to PG1*n*, and PGm1 to PGmn).

Figure 2A:
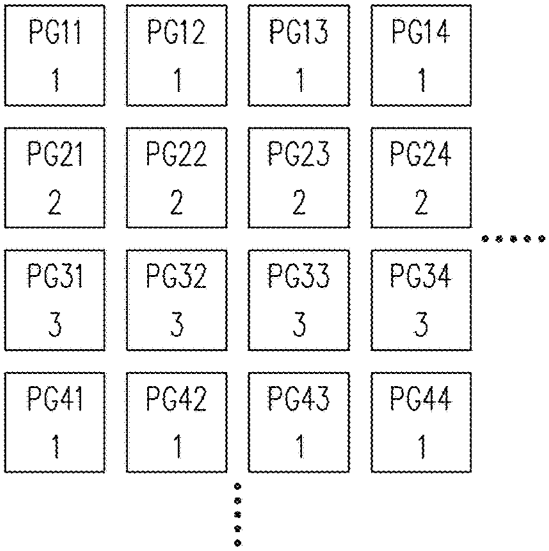
FIG. 2A is a schematic diagram showing the lighting pattern distribution of pixel groups in the display apparatus according to an embodiment of the disclosure.
Figure 2B:
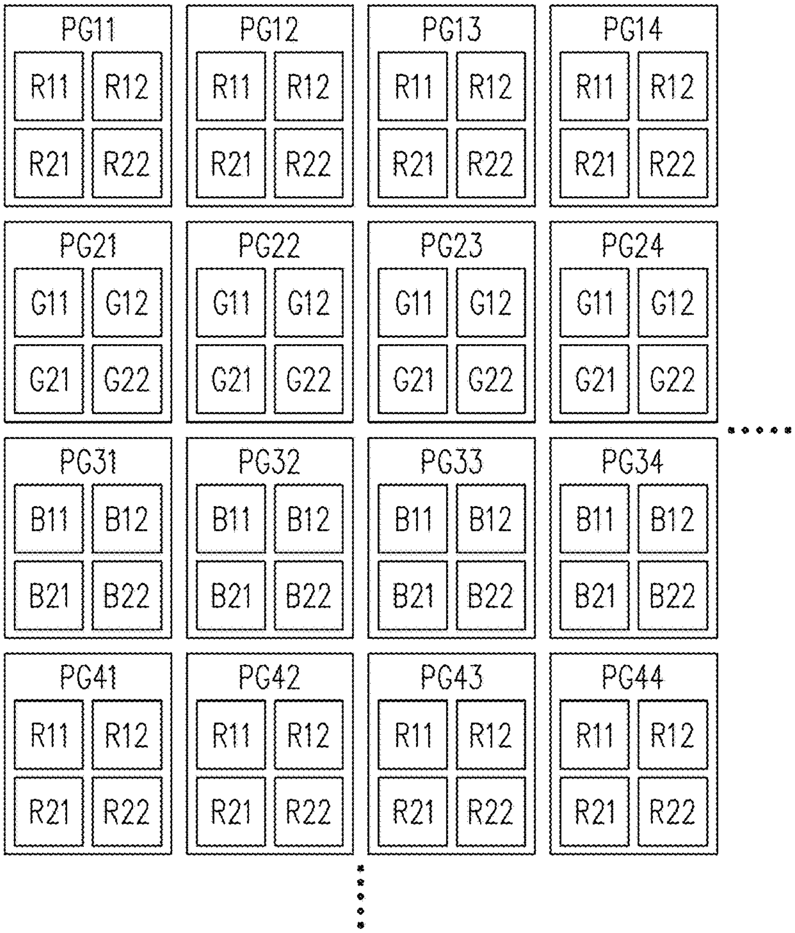
FIGS. 2B to 2D are schematic diagrams showing the lighting distribution of pixel groups in the display apparatus during different illumination periods according to an embodiment of the disclosure.
Figure 2D:
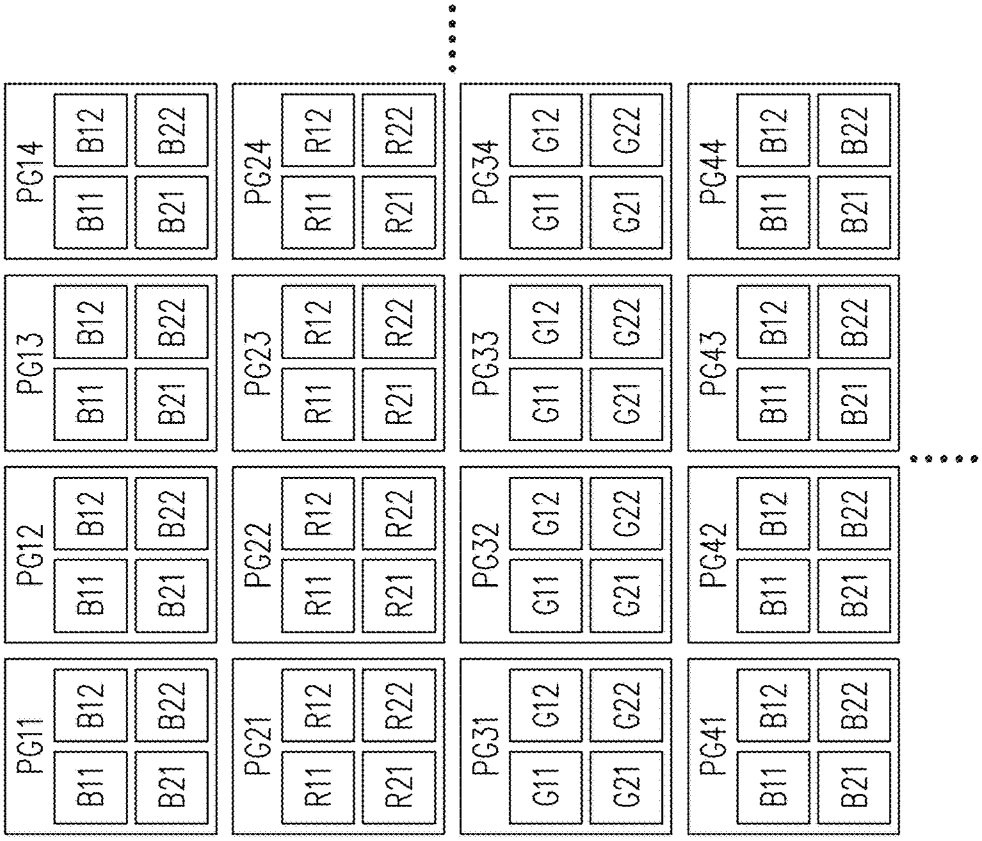
Figure 2C:
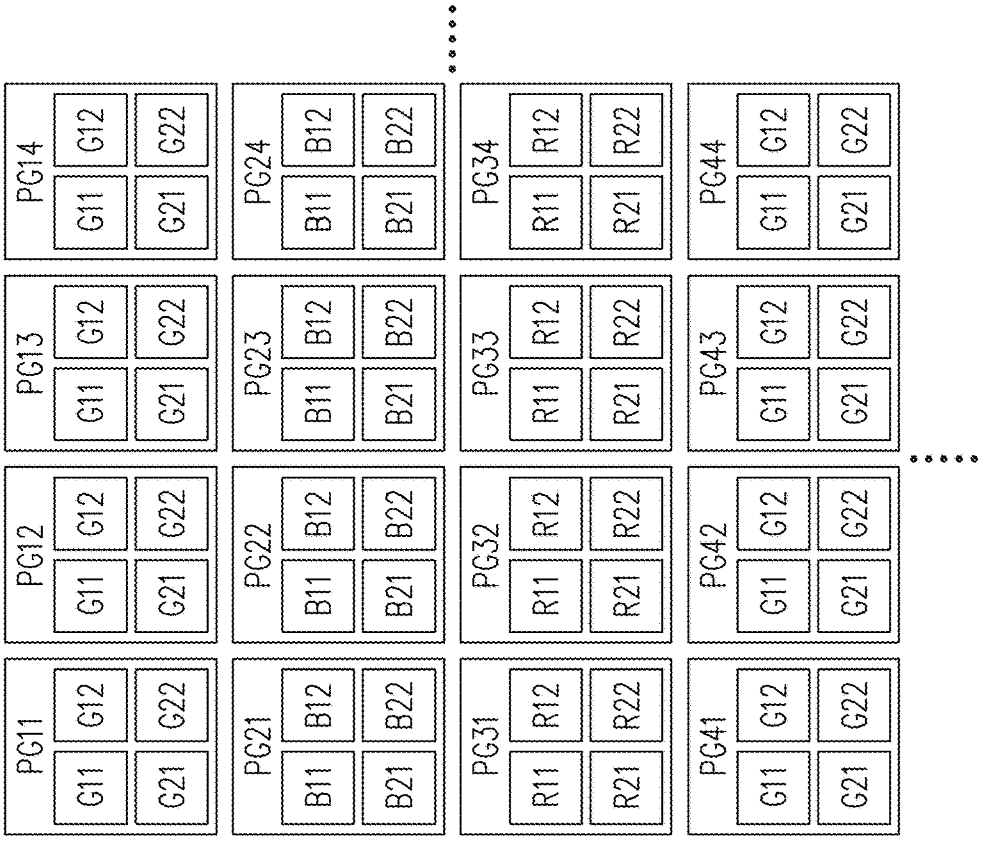

FIG. 2A is a schematic diagram showing the lighting pattern distribution of pixel groups in the display apparatus according to an embodiment of the disclosure. FIGS. 2B to 2D are schematic diagrams showing the lighting distribution of pixel groups during different illumination periods according to an embodiment of the disclosure. Referring to FIG. 1 and FIGS. 2A to 2D, in this embodiment, the pixel groups (such as PG11 to PG14, PG21 to PG24, PG31 to PG34, and PG41 to PG44) in the same row share the same lighting pattern, while the pixel groups (such as PG11 to PG14, PG21 to PG24, PG31 to PG34, and PG41 to PG44) in adjacent rows are classified under different lighting patterns. Specifically, the first row of pixel groups (such as PG11 to PG14) corresponds to a lighting pattern 1, the second row of pixel groups (such as PG21 to PG24) corresponds to a lighting pattern 2, the third row of pixel groups (such as PG31 to PG34) corresponds to a lighting pattern 3, and the fourth row of pixel groups (such as PG41 to PG44) corresponds to the lighting pattern 1, and so on in sequence.

As shown in FIG. 2B, during the first illumination period, the first row of pixel groups (such as PG11 to PG14) illuminates the red light-emitting diodes R11, R12, R21, and R22, the second row of pixel groups (such as PG21 to PG24) illuminates the green light-emitting diodes G11, G12, G21, and G22, the third row of pixel groups (such as PG31 to PG34) illuminates the blue light-emitting diodes B11, B12, B21, and B22, and the fourth row of pixel groups (such as PG41 to PG44) illuminates the red light-emitting diodes R11, R12, R21, and R22, and so on in sequence.

As shown in FIG. 2C, the first row of pixel groups (such as PG11 to PG14) illuminates the green light-emitting diodes G11, G12, G21, and G22, the second row of pixel groups (such as PG21 to PG24) illuminates the blue light-emitting diodes B11, B12, B21, and B22, the third row of pixel groups (such as PG31 to PG34) illuminates the red light-emitting diodes R11, R12, R21, and R22, and the fourth row of pixel groups (such as PG41 to PG44) illuminates the green light-emitting diodes G11, G12, G21, and G22, and so on in sequence.

As shown in FIG. 2D, during the first illumination period, the first row of pixel groups (such as PG11 to PG14) illuminates the blue light-emitting diodes B11, B12, B21, and B22, the second row of pixel groups (such as PG21 to PG24) illuminates the red light-emitting diodes R11, R12, R21, and R22, the third row of pixel groups (such as PG31 to PG34) illuminates the green light-emitting diodes G11, G12, G21, and G22, and the fourth row of pixel groups (such as PG41 to PG44) illuminates the blue light-emitting diodes B11, B12, B21, and B22, and so on in sequence.

Based on the above, the red light-emitting diodes (such as R11, R12, R21, and R22), the green light-emitting diodes (such as G11, G12, G21, and G22), or the blue light-emitting diodes (such as B11, B12, B21, and B22) illuminated by each pixel group (such as PG11 to PGmn) during each illumination period are the same as those illuminated by a horizontally adjacent pixel group (such as PG11 to PGmn).

Figure 2E:
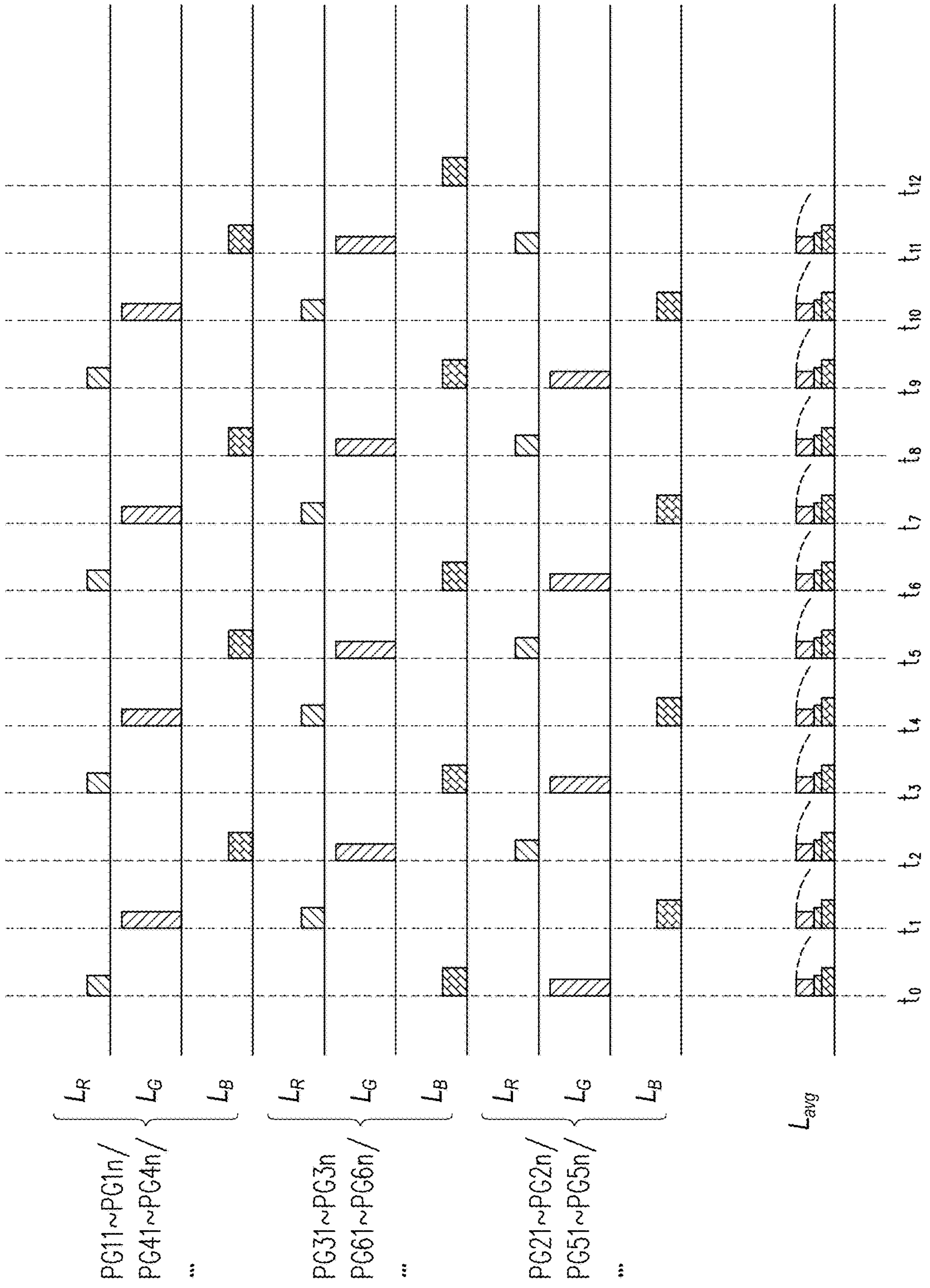
FIG. 2E is a schematic diagram showing the brightness distribution of pixel group lighting in the display apparatus according to an embodiment of the disclosure.

FIG. 2E is a schematic diagram showing the brightness distribution of pixel group lighting in the display apparatus according to an embodiment of the disclosure. Referring to FIG. 1 and FIGS. 2A to 2E, in this embodiment, to achieve the requirement of optimal electro-optical conversion efficiency, a current level LV1 for driving the red light-emitting diodes (such as R11, R12, R21, and R22), a current level LV2 for the green light-emitting diodes (such as G11, G12, G21, and G22), and a current level LV3 for the blue light-emitting diodes (such as B11, B12, B21, and B22) will be different. Specifically, an instantaneous brightness LR of the red light-emitting diodes (such as R11, R12, R21, and R22) corresponds to the current level LV1, an instantaneous brightness LG of the green light-emitting diodes (such as G11, G12, G21, and G22) corresponds to the current level LV2, and an instantaneous brightness LB of the blue light-emitting diodes (such as B1, B12, B21, and B22) corresponds to the current level LV3. Additionally, the instantaneous brightnesses LR, LG, and LB of the red, green, and blue light-emitting diodes (such as R11, R12, R21, and R22, G11, G12, G21, and G22, and B11, B12, B21, and B22) are different.

Furthermore, as shown in the multiple illumination periods defined by time points $t_0$ to $t_{12}$, the red light-emitting diodes (such as R11, R12, R21, and R22), the green light-emitting diodes (such as G11, G12, G21, and G22), and the blue light-emitting diodes (such as B11, B12, B21, and B22) are illuminated alternately. Specifically, during the period from the time points $t_0$ to $t_1$, in the $1^{st}$, $4^{th}$, etc. rows of pixel groups (such as PG11 to PG1*n*, PG41 to PG4*n*, etc.), the red light-emitting diodes (such as R11, R12, R21, and R22) are illuminated. In the $2^{nd}$, $5^{th}$, etc. rows of pixel groups (such as PG21 to PG2*n*, PG51 to PG5*n*, etc.), the green light-emitting diodes (such as G11, G12, G21, and G22) are illuminated, and in the $3^{rd}$, $6^{th}$, etc. rows of pixel groups (such as PG31 to PG3*n*, PG61 to PG6*n*, etc.), the blue light-emitting diodes (such as B11, B12, B21, and B22) are illuminated. During the period from the time points $t_1$ to $t_2$, in the $1^{st}$, $4^{th}$, etc. rows of pixel groups (such as PG11 to PG1*n*, PG41 to PG4*n*, etc.), the green light-emitting diodes (such as G11, G12, G21, and G22) are illuminated. In the $2^{nd}$, $5^{th}$, etc. rows of pixel groups (such as PG21 to PG2*n*, PG51 to PG5*n*, etc.), the blue light-emitting diodes (such as B11, B12, B21, and B22) are illuminated, and in the $3^{rd}$, $6^{th}$, etc. rows of pixel groups (such as PG31 to PG3*n*, PG61 to PG6*n*, etc.), the red light-emitting diodes (such as R11, R12, R21, and R22) are illuminated. During the period from the time points $t_2$ to $t_3$, in the $1^{st}$, $4^{th}$, etc. rows of pixel groups (such as PG11 to PG1*n*, PG41 to PG4*n*, etc.), the blue light-emitting diodes (such as B11, B12, B21, and B22) are illuminated. In the $2^{nd}$, $5^{th}$, etc. rows of pixel groups (such as PG21 to PG2*n*, PG51 to PG5*n*, etc.), the red light-emitting diodes (such as R11, R12, R21, and R22) are illuminated, and in the $3^{rd}$, $6^{th}$, etc. rows of pixel groups (such as PG31 to PG3*n*, PG61 to PG6*n*, etc.), the green light-emitting diodes (such as G11, G12, G21, and G22) are illuminated. The rest may be referenced in FIG. 2E, which will not be further detailed here.

As shown in each illumination period (e.g., between the time points $t_0$ to $t_1$, $t_1$ to $t_2$, etc.), the red light-emitting diodes (such as R11, R12, R21, and R22), the green light-emitting diodes (such as G11, G12, G21, and G22), and the blue light-emitting diodes (such as B11, B12, B21, and B22) are illuminated in different pixel groups (such as PG11 to PG1*n*, PG21 to PG2*n*, PG31 to PG3*n*, PG41 to PG4*n*, PG51 to PG5*n*, PG61 to PG6*n*, etc.), resulting in an average instantaneous brightness $L_{avg}$ that is essentially consistent.

Figure 3:
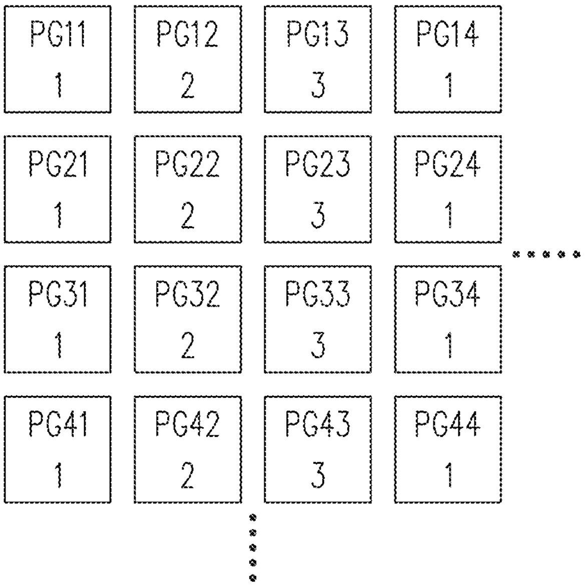
FIG. 3 is a schematic diagram showing the lighting pattern distribution of pixel groups in the display apparatus according to another embodiment of the disclosure.

FIG. 3 is a schematic diagram showing the lighting pattern distribution of pixel groups in the display apparatus according to another embodiment of the disclosure. Referring to FIG. 1, FIG. 2A, and FIG. 3, in this embodiment, pixel groups (such as PG11 to PG14, PG21 to PG24, PG31 to PG34, and PG41 to PG44) in the same column share the same lighting pattern, while pixel groups (such as PG11 to PG14, PG21 to PG24, PG31 to PG34, and PG41 to PG44) in adjacent columns are classified under different lighting patterns. Specifically, the first column of pixel groups (such as PG11 to PG41) corresponds to the lighting pattern 1, the second column of pixel groups (such as PG12 to PG42) corresponds to the lighting pattern 2, the third column of pixel groups (such as PG13 to PG43) corresponds to the lighting pattern 3, and the fourth column of pixel groups (such as PG14 to PG44) corresponds to the lighting pattern 1, and so on in sequence.

That is, the red light-emitting diodes (such as R11, R12, R21, and R22), the green light-emitting diodes (such as G11, G12, G21, and G22), or the blue light-emitting diodes (such as B11, B12, B21, and B22) illuminated by each pixel group (such as PG11 to PGmn) during each illumination period are the same as those illuminated by a vertically adjacent pixel group (such as PG11 to PGmn).

Figure 4:
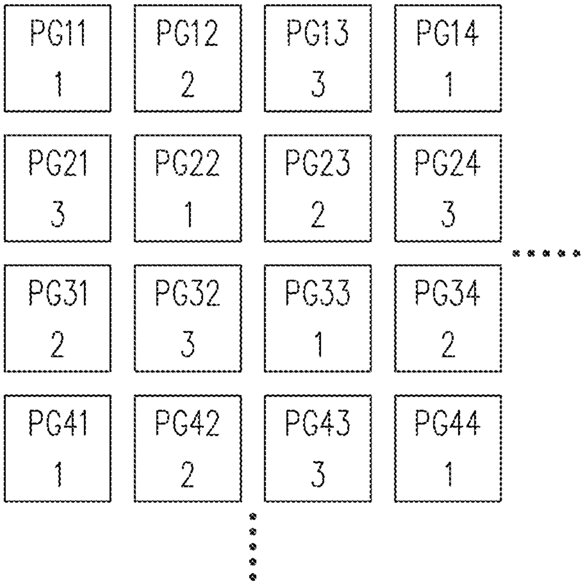
FIG. 4 is a schematic diagram showing the lighting pattern distribution of pixel groups in the display apparatus according to yet another embodiment of the disclosure.

FIG. 4 is a schematic diagram showing the lighting pattern distribution of pixel groups in the display apparatus according to yet another embodiment of the disclosure. Referring to FIG. 1, FIG. 2A, and FIG. 4, in this embodiment, pixel groups (such as PG11 to PG14, PG21 to PG24, PG31 to PG34, and PG41 to PG44) arranged in a diagonal pattern from the top-left to bottom-right share the same lighting pattern, while adjacent pixel groups (such as PG11 to PG14, PG21 to PG24, PG31 to PG34, and PG41 to PG44) are classified under different lighting patterns. Specifically, the pixel groups PG11, PG22, PG33, PG44, PG14, PG41, and so on, correspond to the lighting pattern 1, the pixel groups PG12, PG23, PG34, PG31, PG42, and so on, correspond to the lighting pattern 2, and the pixel groups PG13, PG24, PG21, PG32, PG43 correspond to the lighting pattern 3, and so on in sequence.

That is, the red light-emitting diodes (such as R11, R12, R21, and R22), the green light-emitting diodes (such as G11, G12, G21, and G22), or the blue light-emitting diodes (such as B11, B12, B21, and B22) illuminated by each pixel group (such as PG11 to PG14, PG21 to PG24, PG31 to PG34, and PG41 to PG44) during each illumination period are the same as those illuminated by a diagonally adjacent pixel group (such as PG11 to PG14, PG21 to PG24, PG31 to PG34, and PG41 to PG44).

Figure 5:
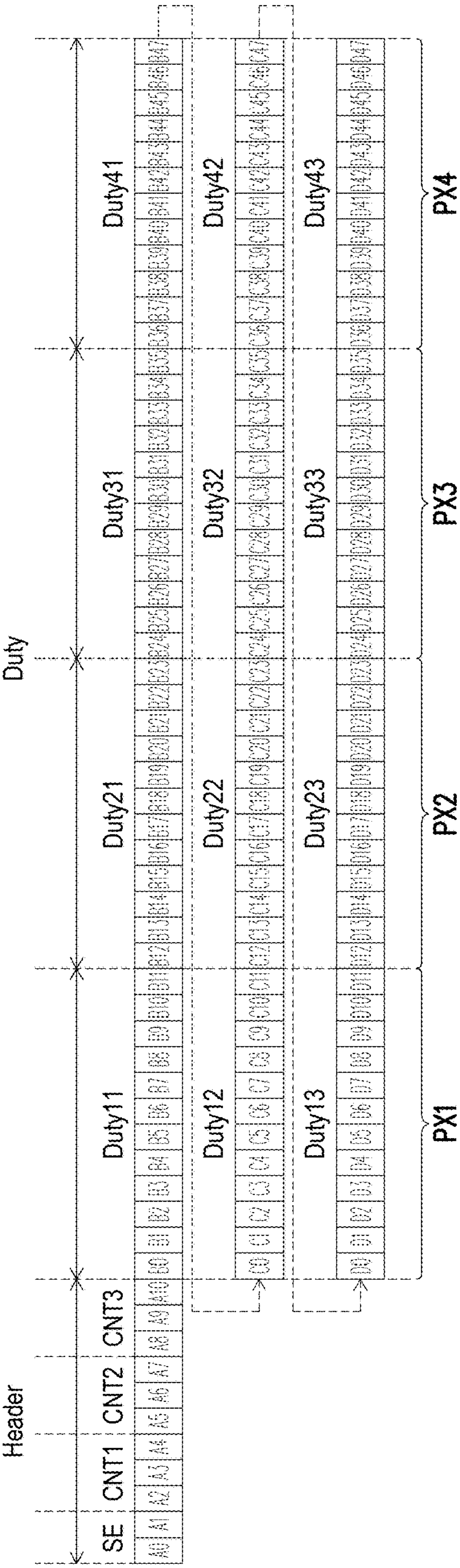
FIG. 5 is a schematic diagram showing the data format of display data in the display apparatus according to an embodiment of the disclosure.

FIG. 5 is a schematic diagram showing the data format of display data in the display apparatus according to an embodiment of the disclosure. Referring to FIG. 1 and FIG. 5, in this embodiment, each display data (such as Vdata_1 to Vdata_n) includes a header field Header (in this example, eleven bits A0 to A10) and a duty field portion Duty (in this example, 144 bits B0 to B47, C0 to C47, DO to D47). The duty field portion Duty includes multiple duty fields Duty11 to Duty13, Duty21 to Duty23, Duty31 to Duty33, and Duty41 to Duty43.

In this embodiment, the bits A0 to A1 of the header field Header (i.e., a sequential data SE) determine the illumination sequence of the red light-emitting diodes R11, R12, R21, and R22, the green light-emitting diodes G11, G12, G21, and G22, and the blue light-emitting diodes B11, B12, B21, and B22 in each pixel group (such as PG11 to PG1*n*, and PGm1 to PGmn). That is, it determines whether each pixel group (such as PG11 to PG1*n*, and PGm1 to PGmn) illuminates the red light-emitting diodes R11, R12, R21, and R22, the green light-emitting diodes G11, G12, G21, and G22, or the blue light-emitting diodes B11, B12, B21, and B22 during each illumination period.

Additionally, the bits A2 to A4 of the header field Header (i.e., a current data CNT1) determine the current level for the first-priority illuminated light-emitting diodes of the same color among the red light-emitting diodes (such as R11, R12, R21, and R22), the green light-emitting diodes (such as G11, G12, G21, and G22), and the blue light-emitting diodes (such as B11, B12, B21, and B22). The bits A5 to A7 of the header field Header (i.e., a current data CNT2) determine the current level for the second-priority illuminated light-emitting diodes of the same color among the red light-emitting diodes (such as R11, R12, R21, and R22), the green light-emitting diodes (such as G11, G12, G21, and G22), and the blue light-emitting diodes (such as B11, B12, B21, and B22). The bits A8 to A10 of the header field Header (i.e., a current data CNT3) determine the current level for the third-priority illuminated light-emitting diodes of the same color among the red light-emitting diodes (such as R11, R12, R21, and R22), the green light-emitting diodes (such as G11, G12, G21, and G22), and the blue light-emitting diodes (such as B11, B12, B21, and B22).

Furthermore, each of the duty fields Duty11 to Duty13, Duty21 to Duty23, Duty31 to Duty33, and Duty41 to Duty43 respectively determines the current pulse width for illuminating the red light-emitting diodes R11, R12, R21, and R22, the green light-emitting diodes G11, G12, G21, and G22, and the blue light-emitting diodes B11, B12, B21, and B22 in the pixel circuits PX1 to PX4 of each pixel group (such as PG11 to PG1*n*, and PGm1 to PGmn).

For example, assuming each pixel group (such as PG11 to PG1*n*, and PGm1 to PGmn) illuminates the red light-emitting diodes R11, R12, R21, and R22 first, then the green light-emitting diodes G11, G12, G21, and G22, and finally the blue light-emitting diodes B11, B12, B21, and B22, in that case, the current data CNT1 determines the current level for driving the red light-emitting diodes R11, R12, R21, and R22, the current data CNT2 determines the current level for driving the green light-emitting diodes G11, G12, G21, and G22, and the current data CNT3 determines the current level for driving the blue light-emitting diodes B11, B12, B21, and B22.

The Duty fields Duty11, Duty21, Duty31, and Duty41 respectively determine the current pulse width for the red light-emitting diodes R11, R12, R21, and R22. The duty fields Duty12, Duty22, Duty32, and Duty42 respectively determine the current pulse width for the green light-emitting diodes G11, G12, G21, and G22. The duty fields Duty13, Duty23, Duty33, and Duty43 respectively determine the current pulse width for the blue light-emitting diodes B11, B12, B21, and B22.

Figure 6:
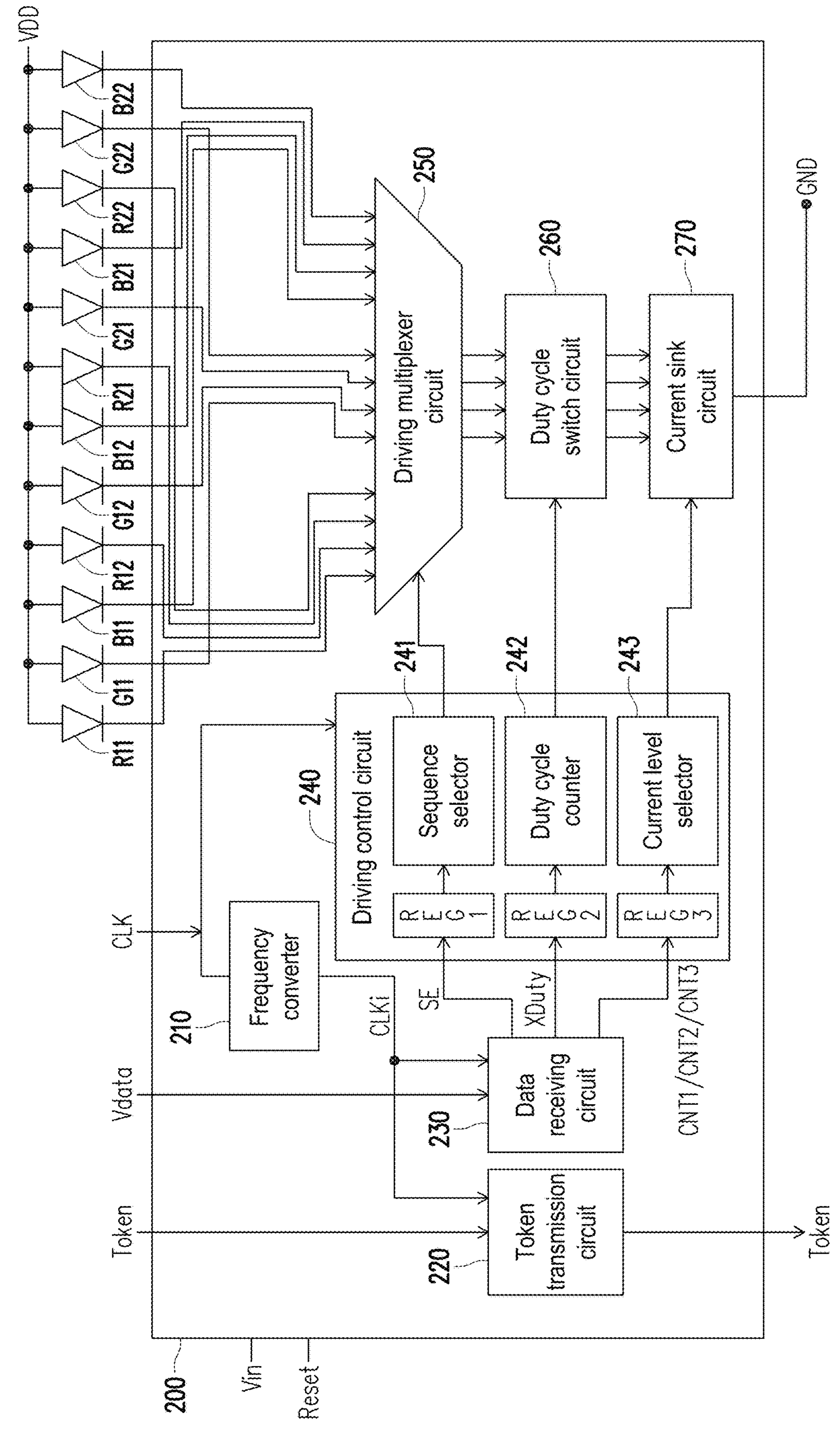
FIG. 6 is a circuit schematic diagram of the display driving circuit in the display apparatus according to an embodiment of the disclosure.

FIG. 6 is a circuit schematic diagram of the display driving circuit in the display apparatus according to an embodiment of the disclosure. Referring to FIG. 1, FIG. 5, and FIG. 6, each display driving circuit (such as 120_11 to 120_1*n*, and 120_*m*1 to 120_*mn*) may take a display driving circuit 200 as an example, though the embodiments of the disclosure are not limited thereto. In this embodiment, the display driving circuit 200 receives an input voltage Vin and a reset signal Reset, and includes a frequency converter 210, a token transmission circuit 220, a data receiving circuit 230, a driving control circuit 240, a driving multiplexer circuit 250, a duty cycle switch circuit 260, and a current sink circuit 270.

The frequency converter 210 receives the clock signal CLK to provide an internal clock signal CLKi. The token transmission circuit 220 receives the timing token Token and the internal clock signal CLKi to activate each display driving circuit 200 for data updating, and outputs the timing token Token upon completion of data updating. The data receiving circuit 230 receives the display data Vdata (i.e., a corresponding one of the display data Vdata_1 to Vdata_n) and the internal clock signal CLKi, to capture the display data Vdata based on the internal clock signal CLKi. Then, the data receiving circuit 230 provides sequential data SE and current data CNT1 to CNT3 based on the header field Header of the captured display data Vdata, and provides a duty cycle data XDuty based on the duty fields Duty11 to Duty13, Duty21 to Duty23, Duty31 to Duty33, Duty41 to Duty43 of the captured display data Vdata.

The driving multiplexer circuit 250 is coupled to the cathodes of the red light-emitting diodes R11, R12, R21, and R22, the green light-emitting diodes G11, G12, G21, and G22, and the blue light-emitting diodes B11, B12, B21, and B22 of a corresponding one of the pixel groups (such as PG11 to PG1*n*, and PGm1 to PGmn). The duty cycle switch circuit 260 is coupled to the driving multiplexer circuit 250, and the current sink circuit 270 is coupled between the duty cycle switch circuit 260 and the ground voltage GND. The driving control circuit 240 receives the clock signal CLK and is coupled to the data receiving circuit 230, the driving multiplexer circuit 250, the duty cycle switch circuit 260, and the current sink circuit 270.

The driving control circuit 240 controls the driving multiplexer circuit 250 based on the sequential data SE to connect the red light-emitting diodes R11, R12, R21, and R22, the green light-emitting diodes G11, G12, G21, and G22, or the blue light-emitting diodes B11, B12, B21, and B22 of a corresponding one of the pixel groups (such as PG11 to PG1*n*, and PGm1 to PGmn) to the duty cycle switch circuit 260. Additionally, the driving control circuit 240 controls the duty cycle switch circuit 260 based on the duty cycle data XDuty to determine the duty cycle of each of the red light-emitting diodes R11, R12, R21, and R22, the green light-emitting diodes G11, G12, G21, and G22, and the blue light-emitting diodes B11, B12, B21, and B22 in the corresponding pixel group (such as PG11 to PG1*n*, and PGm1 to PGmn). This means it determines the current pulse width for illuminating the red light-emitting diodes R11, R12, R21, and R22, the green light-emitting diodes G11, G12, G21, and G22, and the blue light-emitting diodes B11, B12, B21, and B22.

Furthermore, the driving control circuit 240 controls the current sink circuit 270 based on the current data CNT1 to CNT3 to determine the first current level for driving the red light-emitting diodes R11, R12, R21, and R22 (as shown as LV1 in FIG. 2E), the second current level for driving the green light-emitting diodes G11, G12, G21, and G22 (as shown as LV2 in FIG. 2E), and the third current level for driving the blue light-emitting diodes B11, B12, B21, and B22 (as shown as LV3 in FIG. 2E).

For example, assuming that the sequential data SE indicates to illuminate the green light-emitting diodes G11, G12, G21, and G22 first, the driving control circuit 240, based on the sequential data SE, initially connects the green light-emitting diodes G11, G12, G21, and G22 to the duty cycle switch circuit 260. The working periods for the green light-emitting diodes G11, G12, G21, and G22 are then determined individually based on duty fields Duty11, Duty21, Duty31, and Duty41, and the current level for driving the green light-emitting diodes G11, G12, G21, and G22 is determined based on the current data CNT1.

Next, the driving control circuit 240 connects the blue light-emitting diodes B11, B12, B21, and B22 to the duty cycle switch circuit 260 based on the sequential data SE. The working periods for the blue light-emitting diodes B11, B12, B21, and B22 are then determined individually based on the duty fields Duty12, Duty22, Duty32, and Duty42, and the current level for driving the blue light-emitting diodes B11, B12, B21, and B22 is determined based on the current data CNT2.

Finally, the driving control circuit 240 connects the red light-emitting diodes R11, R12, R21, and R22 to the duty cycle switch circuit 260 based on the sequential data SE. The working periods for the red light-emitting diodes R11, R12, R21, and R22 are then determined individually based on the duty fields Duty13, Duty23, Duty33, and Duty43, and the current level for driving the red light-emitting diodes R11, R12, R21, and R22 is determined based on the current data CNT3. This completes a data update cycle for the display driving circuit 200 and the corresponding pixel group (such as PG11 to PG1*n*, and PGm1 to PGmn).

In this embodiment, the driving control circuit 240 includes a first register REG1, a second register REG2, a third register REG3, a sequence selector 241, a duty cycle counter 242, and a current level selector 243. The first register REG1 stores the sequential data SE. The sequence selector 241 is coupled to the first register REG1 and the driving multiplexer circuit 250 to control the driving multiplexer circuit 250 based on the sequential data SE. The second register REG2 stores the duty cycle data XDuty. The duty cycle counter 242 is coupled to the second register REG2 and the duty cycle switch circuit 260 to control the duty cycle switch circuit 260 based on the duty cycle data XDuty. The third register REG3 stores the current data CNT1 to CNT3. The current level selector 243 is coupled to the third register REG3 and the current sink circuit 270 to control the current sink circuit 270 based on the current data CNT1 to CNT3.

Figure 7:
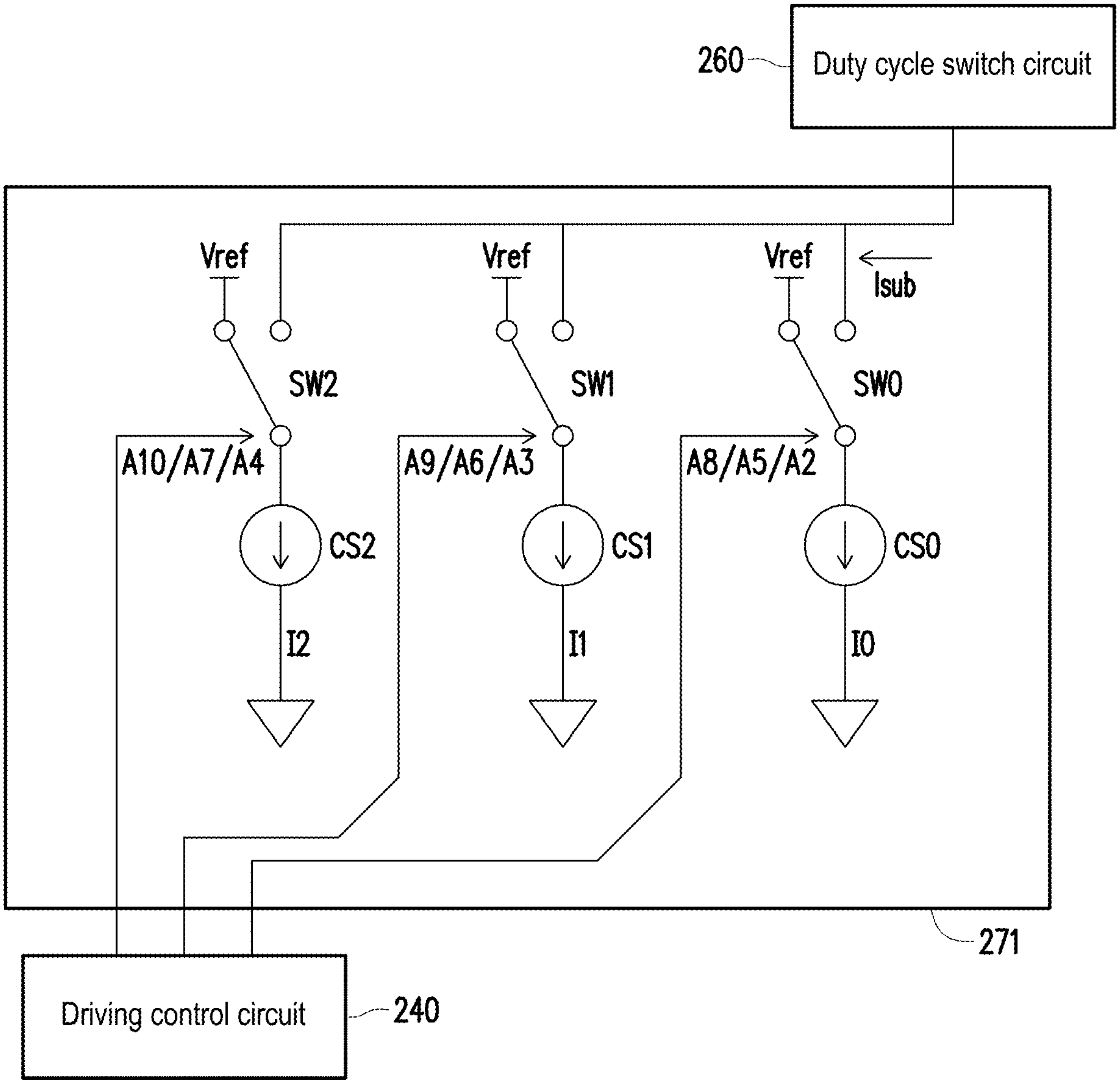
FIG. 7 is a circuit schematic diagram of the current sink circuit in the display driving circuit of the display apparatus according to an embodiment of the disclosure.

FIG. 7 is a circuit schematic diagram of the current sink circuit in the display driving circuit of the display apparatus according to an embodiment of the disclosure. Referring to FIG. 1, FIG. 5, FIG. 6, and FIG. 7, the current sink circuit 270 may be exemplified by a current sink circuit 271. In this embodiment, the current sink circuit 271 includes a first current source CS0, a second current source CS1, a third current source CS2, a first current switch SW0, a second current switch SW1, and a third current switch SW2.

The first current source CS0 provides a first current I0, the second current source CS1 provides a second current I1, and the third current source CS2 provides a third current I2, where the magnitudes of the first current I0, the second current I1, and the third current I2 differ from each other. The first current switch SW0 is coupled between the duty cycle switch circuit 260 and the first current source CS0, the second current switch SW1 is coupled between the duty cycle switch circuit 260 and the second current source CS1, and the third current switch SW2 is coupled between the duty cycle switch circuit 260 and the third current source CS2.

In this embodiment, one or more of the first current switch SW0, the second current switch SW1, and the third current switch SW2 are controlled by the driving control circuit 240 to be conductive, thereby determining a current Isub of the duty cycle switch circuit 260, which in turn determines the current level for driving the red light-emitting diodes R11, R12, R21, and R22, the green light-emitting diodes G11, G12, G21, and G22, or the blue light-emitting diodes B11, B12, B21, and B22.

Furthermore, the first current switch SW0 may be controlled by the bit A4 of the current data CNT1, the bit A7 of the current data CNT2, or the bit A10 of the current data CNT3 to connect the duty cycle switch circuit 260 or a reference voltage Vref to the first current source CS0. The second current switch SW1 may be controlled by the bit A3 of the current data CNT1, the bit A6 of the current data CNT2, or the bit A9 of the current data CNT3 to connect the duty cycle switch circuit 260 or the reference voltage Vref to the second current source CS1. Additionally, the third current switch SW2 may be controlled by the bit A2 of the current data CNT1, the bit A5 of the current data CNT2, or the bit A8 of the current data CNT3 to connect the duty cycle switch circuit 260 or the reference voltage Vref to the third current source CS2. However, the embodiments of the disclosure are not limited to this configuration.

In this embodiment, the magnitudes of the first current I0, the second current I1, and the third current I2 are in a geometric series. For example, the magnitude of the second current I1 may be twice the magnitude of the first current I0, and the third current I2 may be twice the magnitude of the second current I1 (that is, four times the magnitude of the first current I0).

In summary, the display apparatus according to embodiments of the disclosure allows for the illumination of some red light-emitting diodes, some green light-emitting diodes, and some blue light-emitting diodes within all pixel groups during a single illumination period. This staggered lighting sequence for the red, green, and blue light-emitting diodes across different but adjacent pixel groups enhances brightness stability over time at various positions on the display panel, thereby reducing visual fatigue for the user during prolonged viewing.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A display apparatus, comprising:

a plurality of pixel circuits, arranged in a plurality of arrays and divided into a plurality of pixel groups, each of the plurality of pixel circuits having a first color light-emitting diode, a second color light-emitting diode, and a third color light-emitting diode;

a timing controller, used to provide a plurality of display data; and a plurality of display driving circuits, arranged in a plurality of arrays and individually coupled to the timing controller and a corresponding one of the plurality of pixel groups to drive the plurality of pixel circuits in the corresponding one of the plurality of pixel groups to sequentially illuminate one of the plurality of first color light-emitting diodes, the plurality of second color light-emitting diodes, and the plurality of third color light-emitting diodes in a plurality of illumination periods based on a corresponding one of the plurality of display data, wherein during each of the plurality of illumination periods, the plurality of pixel groups alternately illuminate a part of the plurality of first color light-emitting diodes, a part of the plurality of second color light-emitting diodes, and a part of the plurality of third color light-emitting diodes, wherein the timing controller is further used to provide a timing token and a clock signal, and the timing token is transmitted row by row through the plurality of display driving circuits to activate the plurality of display driving circuits row by row, wherein each of the plurality of display data comprises a header field and a plurality of working fields, wherein the header field determines the plurality of first color light-emitting diodes, the plurality of second color light-emitting diodes, or the plurality of third color light-emitting diodes illuminated by each of the plurality of pixel groups during the each of the plurality of illumination periods and determines a current level for illuminating the plurality of first color light-emitting diodes, the plurality of second color light-emitting diodes, and the plurality of third color light-emitting diodes, and the plurality of working fields respectively determine a current pulse width for illuminating the plurality of first color light-emitting diodes, illuminating the plurality of second color light-emitting diodes, and illuminating the plurality of third color light-emitting diodes in the plurality of pixel circuits of the each of the plurality of pixel groups, wherein each of the plurality of display driving circuits comprises:

a frequency converter, receiving the clock signal to provide an internal clock signal;

a token transmission circuit, receiving the timing token and the internal clock signal to activate the each of the plurality of display driving circuits and outputting the timing token;

a data receiving circuit, receiving the corresponding one of the plurality of display data and the internal clock signal to provide a sequential data and a current data based on the header field of the corresponding one of the plurality of display data, and to provide a duty cycle data based on the plurality of working fields of the corresponding one of the plurality of display data;

a driving multiplexer circuit, coupled to the plurality of first color light-emitting diodes, the plurality of second color light-emitting diodes, and the plurality of third color light-emitting diodes of the corresponding one of the plurality of pixel groups;

a duty cycle switch circuit, coupled to the driving multiplexer circuit;

a current sink circuit, coupled to the duty cycle switch circuit; and a driving control circuit, receiving the clock signal and coupled to the data receiving circuit, the driving multiplexer circuit, the duty cycle switch circuit, and the current sink circuit, wherein the driving control circuit controls the driving multiplexer circuit based on the sequential data to connect the plurality of first color light-emitting diodes, the plurality of second color light-emitting diodes, or the plurality of third color light-emitting diodes of the corresponding one of the plurality of pixel groups to the duty cycle switch circuit, wherein the driving control circuit controls the duty cycle switch circuit based on the duty cycle data to determine a duty cycle for each of the plurality of first color light-emitting diodes, the plurality of second color light-emitting diodes, and the plurality of third color light-emitting diodes of the corresponding one of the plurality of pixel groups, and wherein the driving control circuit controls the current sink circuit based on the current data to determine a first current level for driving the plurality of first color light-emitting diodes, a second current level for driving the plurality of second color light-emitting diodes, and a third current level for driving the plurality of third color light-emitting diodes.

2. The display apparatus according to claim 1, wherein the plurality of first color light-emitting diodes, the plurality of second color light-emitting diodes, or the plurality of third color light-emitting diodes illuminated by each of the plurality of pixel groups during the each of the plurality of illumination periods are the same as the plurality of first color light-emitting diodes, the plurality of second color light-emitting diodes, or the plurality of third color light-emitting diodes illuminated by a horizontally adjacent one of the plurality of pixel groups.

3. The display apparatus according to claim 1, wherein the plurality of first color light-emitting diodes, the plurality of second color light-emitting diodes, or the plurality of third color light-emitting diodes illuminated by each of the plurality of pixel groups during the each of the plurality of illumination periods are the same as the plurality of first color light-emitting diodes, the plurality of second color light-emitting diodes, or the plurality of third color light-emitting diodes illuminated by a vertically adjacent one of the plurality of pixel groups.

4. The display apparatus according to claim 1, wherein the plurality of first color light-emitting diodes, the plurality of second color light-emitting diodes, or the plurality of third color light-emitting diodes illuminated by each of the plurality of pixel groups during the each of the plurality of illumination periods are the same as the plurality of first color light-emitting diodes, the plurality of second color light-emitting diodes, or the plurality of third color light-emitting diodes illuminated by a diagonally adjacent one of the plurality of pixel groups.

5. The display apparatus according to claim 1, wherein the driving control circuit comprises:

a first register, storing the sequential data;

a sequence selector, coupled to the first register and the driving multiplexer circuit to control the driving multiplexer circuit based on the sequential data;

a second register, storing the duty cycle data;

a duty cycle counter, coupled to the second register and the duty cycle switch circuit to control the duty cycle switch circuit based on the duty cycle data;

a third register, storing the current data; and a current level selector, coupled to the third register and the current sink circuit to control the current sink circuit based on the current data.

6. The display apparatus according to claim 1, wherein the current sink circuit comprises:

a first current source, providing a first current;

a first current switch, coupled between the duty cycle switch circuit and the first current source;

a second current source, providing a second current;

a second current switch, coupled between the duty cycle switch circuit and the second current source;

a third current source, providing a third current; and a third current switch, coupled between the duty cycle switch circuit and the third current source, wherein one or more of the first current switch, the second current switch, and the third current switch is controlled and turned on by the driving control circuit, and a magnitude of the first current, a magnitude of the second current, and a magnitude of the third current are different from each other.

7. The display apparatus according to claim 6, wherein the magnitude of the first current, the magnitude of the second current, and the magnitude of the third current are in a geometric series.

8. The display apparatus according to claim 1, wherein the plurality of first color light-emitting diodes, the plurality of second color light-emitting diodes, and the plurality of third color light-emitting diodes comprise a plurality of red light-emitting diodes, a plurality of green light-emitting diodes, and a plurality of blue light-emitting diodes.

* * * * *